UNITED STATES PATENT OFFICE.

LUCIEN MORISSE, OF PARIS, FRANCE.

PROCESS FOR THE DIRECT UTILIZATION OF THE LACTIFEROUS JUICES OF CAOUTCHOUC, GUTTA-PERCHA, AND BALATA.

No. 859,611.  Specification of Letters Patent.  Patented July 9, 1907.

Application filed December 20, 1905. Serial No. 292,660.

*To all whom it may concern:*

Be it known that I, LUCIEN MORISSE, a citizen of the Republic of France, and a resident of Paris, France, have invented a new and useful Improved Process for the Direct Utilization of the Lactiferous Juices of Caoutchouc, Gutta-Percha, and Balata, which process is fully set forth in the following specification.

Hitherto caoutchoucs, gutta perchas and balatas have reached the market in the form of loaves, blocks, sheets or the like. They are then treated by known processes for the purpose of converting them into manufactured articles.

My application for patent of even date relates to a process for the treatment of the lactiferous juices of caoutchouc, gutta percha and balata, permitting of transporting them in a liquid state, and the present invention has for its object a process permitting of the direct utilization of these lactiferous juices while still liquid, for the purpose of obtaining manufactured articles.

In the case of caoutchouc juices the treatment is as follows: The milk is poured directly in layers or otherwise upon or into the molds, frames or the like of wood, iron canvas, earth or other appropriate substances and the milk thus molded is then coagulated by a chemical, mechanical or physical agent of any suitable kind, and in the case of caoutchouc milks or juices, especially by means of the following solution: beech creosote 2.50 gr., guaiacol .50 gr., alcohol @ 90° 50.00 gr. Commercial sulfuric acid is added to this solution, twenty five grams per liter of water, for example. On an average, 150 grams approximately of this solution sufficiently coagulate, and render antiseptic one liter of the milk. This solution also acts on the milk or juice in a manner similar to a vulcanizing agent, and the resulting product has substantially the same properties that vulcanization would impart to the same, that is to say, it does not stick together when cut, it resists high or low temperatures without change, and it retains exactly and permanently the shape that has been given to it. Nevertheless in the case of caoutchouc juice, the proportion of sulfuric acid should vary according as the juice belongs to one of the following sorts: hevea, castilloa, landolphia, manihot or other euphorbiaceæ.

In a manner similar to that set forth with reference to articles made of india rubber, it is possible, for all the applications of plastic gums (gutta percha) and mixed gums (balata) such applications comprising, for example, proofing fabrics, the manufacture of belts, electric wires and cables and so forth to employ the milks or juices in the liquid state instead of using dry gums and to coagulate them during their molding by a physical means such as heat or vaporation *in vacuo*, or mechanical means such as churning, centrifugal treatment, or chemical means such as alcohol or other appropriate substance.

Having now particularly described and ascertained the nature of my said invention and in what manner the same is to be performed, I declare that what I claim is:

1. A process for directly utilizing the lactiferous juices of caoutchouc, which consists in pouring the juices into molds and then coagulating them by a solution of beech creosote and guaiacol in alcohol.

2. The process for coagulating the lactiferous juices of caoutchouc, which consists in treating the same with a solution of beech creosote and guaiacol in alcohol.

In testimony whereof I have signed this specification in the presence of two subscribing witnesses.

LUCIEN MORISSE.

Witnesses:
EMILE LEDRET,
H. C. COXE.